(12) United States Patent
Patra et al.

(10) Patent No.: US 12,164,423 B2
(45) Date of Patent: Dec. 10, 2024

(54) METHOD AND SYSTEM FOR IMPROVING CACHE MANAGEMENT IN A 5G NETWORK FUNCTION

(71) Applicant: Samsung Electronics Co., Ltd., Suwon-si (KR)

(72) Inventors: Chandan Swarup Patra, Bangalore (IN); Tarun Khandelwal, Bangalore (IN); Sanket Markan, Bangalore (IN); Sushmit Karar, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 168 days.

(21) Appl. No.: 17/851,761

(22) Filed: Jun. 28, 2022

(65) Prior Publication Data

US 2022/0414008 A1 Dec. 29, 2022

Related U.S. Application Data

(63) Continuation of application No. PCT/KR2022/009236, filed on Jun. 28, 2022.

(30) Foreign Application Priority Data

Jun. 28, 2021 (IN) .............................. 202141028888
Apr. 22, 2022 (IN) ............................. 2021 41028888

(51) Int. Cl.
*G06F 12/0802* (2016.01)

(52) U.S. Cl.
CPC ...... *G06F 12/0802* (2013.01); *G06F 2212/60* (2013.01)

(58) Field of Classification Search
CPC .................. G06F 12/0802; G06F 2212/60
See application file for complete search history.

(56) References Cited

U.S. PATENT DOCUMENTS 10,949,352 B1 * 3/2021 Kimelman .......... G06F 12/0842
2013/0185475 A1 * 7/2013 Talagala .............. G06F 12/0866
711/102

(Continued)

FOREIGN PATENT DOCUMENTS

KR     10-2267267 B1    6/2021
WO     2020/178622 A1   9/2020
WO     2021/088981 A1   5/2021

OTHER PUBLICATIONS

3GPP; 3rd Generation Partnership Project; Technical Specification Group Services and System Aspects; System architecture for the 5G System (5GS); Stage 2 (Release 17); 3GPP TS 23.501; V17.1.1; Valbonne, France; Jun. 24, 2021.

(Continued)

*Primary Examiner* — Jane W Benner
(74) *Attorney, Agent, or Firm* — Jefferson IP Law, LLP

(57) ABSTRACT

A method and system for improving cache management in a 5th generation (5G) network function (NF) is provided. The method includes receiving a list of requests from a plurality of user equipment (UE) requiring access to their corresponding user context. The method further includes determining a priority value for each of the plurality of UEs in the received list based on at least one of analytics data received from a network and data analysis function (NWDAF), paging data, or cache eviction policy. The method further includes prioritizing storage of user contexts in a local cache unit based on the priority value for each of the plurality of UEs. The method further includes receiving a request for accessing a user context from a UE of the plurality of UEs and accessing the user context from the cache unit based on the received request.

18 Claims, 5 Drawing Sheets

(56) References Cited

U.S. PATENT DOCUMENTS

| | | | |
|---|---|---|---|
| 2015/0257012 A1 | 9/2015 | Zhang | |
| 2016/0080275 A1* | 3/2016 | Kumaresh | H04L 47/24 |
| | | | 709/224 |
| 2018/0198884 A1 | 7/2018 | Debald et al. | |
| 2018/0307624 A1 | 10/2018 | Zmora et al. | |
| 2019/0391933 A1* | 12/2019 | Gupta | G06F 12/123 |
| 2020/0305025 A1 | 9/2020 | Liu et al. | |
| 2020/0356494 A1 | 11/2020 | Gupta et al. | |
| 2020/0404565 A1 | 12/2020 | Won et al. | |
| 2021/0014703 A1 | 1/2021 | Chou et al. | |
| 2021/0176649 A1 | 6/2021 | Rahman et al. | |
| 2022/0086680 A1* | 3/2022 | Kwok | H04W 28/0268 |
| 2022/0248271 A1 | 8/2022 | Liang | |

OTHER PUBLICATIONS

Lenovo et al.; KI#11, Sol#35: Clarifications on DCNF identifying NFs and caching locally data; 3GPP TSG-SA WG2 Meeting #141e; S2-2007236; Oct. 2, 2020.

International Search Report with Written Opinion dated Oct. 4, 2022; International Appln. No. PCT/KR2022/009236.

Indian Office Action dated Apr. 28, 2023; Indian Appln. No. 202141028888.

3GPP, Technical Specification Group Services and System Aspects, System Architecture for the 5G System, Stage 2 (Release 16), 3GPP TS 23.501 Draft V16.0.0+, XP051688561, Feb. 2019.

Extended European Search Report dated Sep. 2, 2024, issued in European Application No. 22833587.3-1215.

\* cited by examiner

METHOD AND SYSTEM FOR IMPROVING CACHE MANAGEMENT IN A 5G NETWORK FUNCTION

CROSS-REFERENCE TO RELATED APPLICATION(S)

This application is a continuation application, claiming priority under § 365(c), of an International application No. PCT/KR2022/009236, filed on Jun. 28, 2022, which is based on and claims the benefit of an Indian Provisional patent application number 202141028888, filed on Jun. 28, 2021, in the Indian Intellectual Property Office, and of an Indian Complete patent application number 202141028888, filed on Apr. 22, 2022, in the Indian Intellectual Property Office, the disclosure of each of which is incorporated by reference herein in its entirety.

FIELD OF THE INVENTION

The disclosure relates to method and system for improving cache management in a $5^{th}$ generation (5G) network function (NF).

BACKGROUND

In a $4^{th}$ generation (4G) core network, servers are monolithic servers where user context is stored locally. The user data maintained in a mobility management entity (MME) and gateway (GW) are implementation specific. However, in a 5G core network, service based architecture (SBA) is followed which allows the 5G core services to be deployed in a scalable manner. For making this application stateless to allow scaling, unstructured data storage function (UDSF) is used.

As per the $3^{rd}$ generation partnership project (3GPP) 23.501 specification, 5G system architecture allows any network function (NF) to store and retrieve its unstructured data into/from the UDSF (e.g., user equipment (UE) contexts). NFs may share a UDSF for storing their respective unstructured data or may each have their own UDSF (e.g., a UDSF may be located close to the respective NF). This introduction of UDSF in a 5G core architecture brings in additional delay because it requires user context access from a $3^{rd}$ party node. To avoid frequent UDSF access, a cache manager is introduced in 5G NF deployment. Deployments in the related art use least recently used (LRU), least frequently used (LFU), first in first out (FIFO), and the like, cache eviction strategies for management of user context cache data. Each algorithm maintains an internal queue to maintain the user requests for cache access.

However, the cache algorithms of the related art do not have a high cache hit rate in the 5G core network, as the cache algorithms pf the related art are not tuned for 5G core scenarios. This results in higher cache miss and UDSF being contacted regularly for user context access in 5G core servers. This introduces additional delay for various call signaling requests in the 5G core, which requires user context access.

There is no deployment which attempts to improve cache management in a 5G NF utilizing prediction of future events which may require user context access.

The above information is presented as background information only to assist with an understanding of the disclosure. No determination has been made, and no assertion is made, as to whether any of the above might be applicable as prior art with regard to the disclosure.

SUMMARY OF THE PRESENT DISCLOSURE

Aspects of the disclosure are to address at least the above-mentioned problems and/or disadvantages and to provide at least the advantages described below.

Additional aspects will be set forth in part in the description which follows and, in part, will be apparent from the description, or may be learned by practice of the presented embodiments.

In accordance with an aspect of the disclosure, a method for improving cache management in a $5^{th}$ generation (5G) network function (NF) is provided. The method includes receiving a list of requests from a plurality of user equipment (UE) requiring access to their corresponding user context. The method further includes determining a priority value for each of the plurality of UEs in the received list based on at least one of analytics data received from a network and data analysis function (NWDAF), paging data, or cache eviction policy. The method further includes prioritizing storage of user contexts in a cache unit of the 5G NF based on the priority value for each of the plurality of UEs. The method further includes receiving a request for accessing a user context from a UE of the plurality of UEs and accessing the user context from the cache unit based on the received request.

In accordance with an aspect of the disclosure, a system for improving cache management in a 5G NF is provided. The system includes a memory and a processor operatively coupled to the memory. The processor is configured to receive a list of requests from a plurality of UEs requiring access to their corresponding user context. The processor is further configured to determine a priority value for each of the plurality of UEs in the received list based on at least one of analytics data received from a NWDAF, paging data, or cache eviction policy. The processor is further configured to prioritize storage of user contexts in a cache unit of the 5G NF based on the priority value for each of the plurality of UEs. The processor is further configured to receive a request for accessing a user context from a UE of the plurality of UEs and access the user context from the local cache unit based on the received request.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other features, aspects, and advantages of the disclosure will be more apparent from the following description taken in conjunction with the accompanying drawings, in which.

The same reference numerals are used to represent the same elements throughout the drawings.

Figure 1:
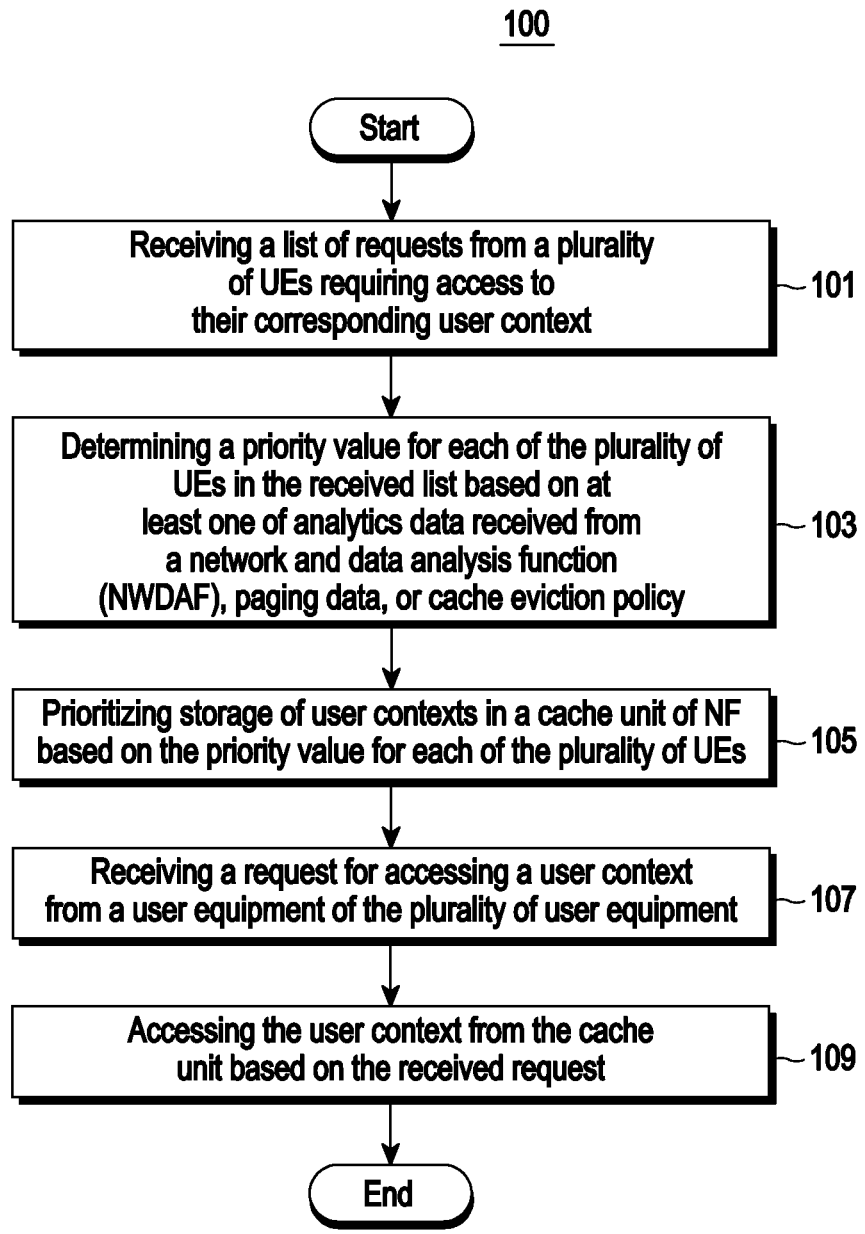
FIG. 1 illustrates a flow diagram depicting a method for improving cache management in a $5^{th}$ generation (5G) network function (NF), according to an embodiment of the disclosure.

Further, skilled artisans will appreciate that elements in the drawings are illustrated for simplicity and may not have been necessarily drawn to scale. For example, the flow charts illustrate the method in terms of the most prominent steps involved to help to improve understanding of aspects of the disclosure. Furthermore, in terms of the construction of the system, one or more components of the system may have been represented in the drawings by conventional symbols, and the drawings may show only those specific details that are pertinent to understanding the embodiments of the disclosure so as not to obscure the drawings with details that will be readily apparent to those of ordinary skill in the art having benefit of the description herein.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

It should be understood at the outset that although illustrative implementations of the embodiments of the disclosure are illustrated below, the disclosure may be implemented using any number of techniques, whether currently known or in existence. The disclosure should in no way be limited to the illustrative implementations, drawings, and techniques illustrated below, including the design and implementation illustrated and described herein, but may be modified within the scope of the appended claims along with their full scope of equivalents.

The term "some" as used herein is defined as "none, or one, or more than one, or all." Accordingly, the terms "none," "one," "more than one," "more than one, but not all" or "all" would all fall under the definition of "some." The term "some embodiments" may refer to no embodiments or to one embodiment or to several embodiments or to all embodiments. Accordingly, the term "some embodiments" is defined as meaning "no embodiment, or one embodiment, or more than one embodiment, or all embodiments."

The terminology and structure employed herein is for describing, teaching and illuminating some embodiments and their specific features and elements and does not limit, restrict or reduce the spirit and scope of the claims or their equivalents.

More specifically, any terms used herein such as but not limited to "includes," "comprises," "has," "consists," and grammatical variants thereof do NOT specify an exact limitation or restriction and certainly do NOT exclude the possible addition of one or more features or elements, unless otherwise stated, and furthermore must NOT be taken to exclude the possible removal of one or more of the listed features and elements, unless otherwise stated with the limiting language "MUST comprise" or "NEEDS TO include."

Whether or not a certain feature or element was limited to being used only once, either way it may still be referred to as "one or more features" or "one or more elements" or "at least one feature" or "at least one element." Furthermore, the use of the terms "one or more" or "at least one" feature or element do NOT preclude there being none of that feature or element, unless otherwise specified by limiting language such as "there NEEDS to be one or more . . . " or "one or more element is REQUIRED."

Unless otherwise defined, all terms, and especially any technical and/or scientific terms, used herein may be taken to have the same meaning as commonly understood by one having an ordinary skill in the art.

It should be noted that the term "user equipment" (UE) refers to any electronic devices used by a user such as a mobile device, a desktop, a laptop, personal digital assistant (PDA) or similar devices.

The disclosure is directed towards improving cache management in a $5^{th}$ generation (5G) network function (NF) utilizing a prediction of events which may require user context access. In particular, the disclosure describes a network and data analysis function (NWDAF), which represents an operator managed network analytics logical function. NWDAF supports analytics information provisioning to NFs, and an analytic function (AF). The analytics provided by the NWDAF can predict UE events that might be received at the 5G NF. Based on the NWDAF being provided information and information from call processing blocks, a higher prioritized UE list may be created for which events may be received at a 5G NF that will require user context access. In a case of the optimized cache eviction process procedure created in the previous operations being used for cache queue management, there is protection from thrashing of UE entries for which cache is stored in a 5G NF.

Embodiments of the disclosure will be described below in detail with reference to the accompanying drawings.

Figure 2:
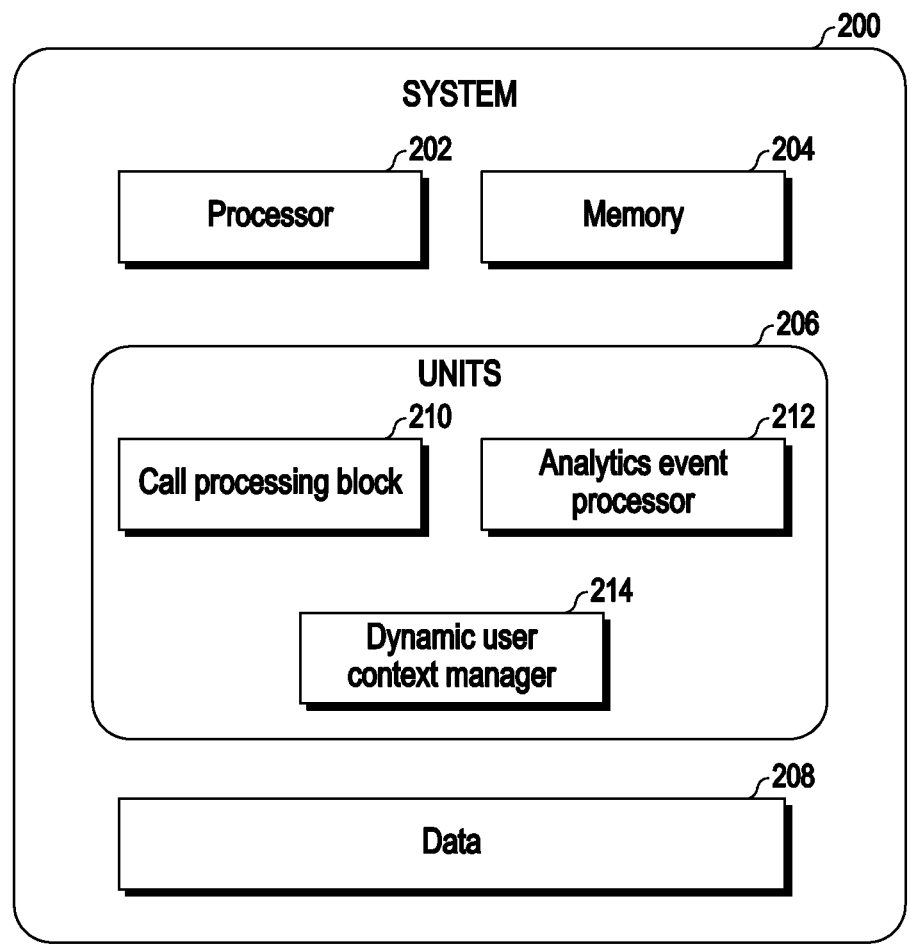
FIG. 2 illustrates a block diagram of a system for improving cache management in a 5G NF, according to an embodiment of the disclosure.

FIG. 2 illustrates a block diagram of a system 200 for improving cache management in a 5G NF, according to an embodiment of the disclosure. For the sake of brevity, the description of the FIGS. 1 and 2 are explained in conjunction with each other.

Referring to FIG. 2, the system 200 may include, but is not limited to, a processor 202, memory 204, units 206, and data 208. The units 206 and the memory 204 may be operatively coupled to the processor 202.

The processor 202 can be a single processing unit or several processing units, all of which could include multiple computing units. The processor 202 may be implemented as one or more of microprocessors, microcomputers, microcontrollers, digital signal processors, central processing units, state machines, logic circuitries, and/or any devices that manipulate signals based on operational instructions. Among other capabilities, the processor 202 is configured to fetch and execute computer-readable instructions and data stored in the memory 204.

The memory 204 may include any non-transitory computer-readable medium known in the art including, for example, volatile memory, such as static random access memory (SRAM) and dynamic random access memory (DRAM), and/or non-volatile memory, such as read-only memory (ROM), erasable programmable ROM, flash memories, hard disks, optical disks, and magnetic tapes.

The units 206 amongst other things, include routines, programs, objects, components, data structures, etc., which perform particular tasks or implement data types. The units 206 may also be implemented as, signal processor(s), state machine(s), logic circuitries, and/or any other device or component that manipulate signals based on operational instructions.

Further, the units 206 can be implemented in hardware, instructions executed by a processing unit, or by a combination thereof. The processing unit can comprise a computer, a processor, such as the processor 202, a state machine, a logic array, or any other suitable devices capable of processing instructions. The processing unit can be a general-purpose processor which executes instructions to cause the general-purpose processor to perform the required tasks or, the processing unit can be dedicated to performing the required functions. In another embodiment of the disclosure, the units 206 may be machine-readable instructions (software) which, when executed by a processor/processing unit, perform any of the described functionalities.

In an embodiment, the units 206 may include a call processing block 210, an analytics event processor 212 and a dynamic user context manager 214. The various units 210-214 may be in communication with each other. The functions of each of the call processing block 210, the analytics event processor 212 and the dynamic user context manager 214 is discussed in detail in conjunction with FIGS. 3 and 4. In an embodiment, the various units 210-214 may be a part of an access and mobility management function (AMF). The data 208 serves, amongst other things, as a repository for storing data processed, received, and generated by one or more of the units 206.

FIG. 1 illustrates a flow diagram depicting a method 100 for improving cache management in a 5G NF, according to an embodiment of the disclosure.

Referring to FIG. 1, at operation 101, the method 100 comprises receiving a list of requests from a plurality of UEs requiring access to their corresponding user context. In an embodiment, prior to receiving the list, at least one UE from the plurality of UEs sends a registration request to the 5G NF and the 5G NF registers the at least one UE. Thereafter, user context related to the at least one UE is stored into an external knowledge database such as a $3^{rd}$ party unstructured data storage function (UDSF). In an embodiment, the user context may include at least one of creation time, tracking area identity (TAI) information, access and mobility (AM) policy received from policy control function (PCF), protocol data unit (PDU) session information, UE Policy received from PCF, UE capability information, Unified Data Management (UDM) address, mobility statistic information of the UE, etc.

Thereafter, at operation 103, the method 100 comprises determining a priority value for each of the plurality of UEs in the received list. The priority value may be determined based on at least one of analytics data received from a NWDAF, paging data, or cache eviction policy. In an embodiment, the cache eviction policy corresponds to cache replacement policies, e.g., least recently used (LRU), least frequently used (LFU), etc.

For example, when a new UE registers on the network, a base priority value is assigned to that UE based on the basic cache eviction policy, so $P_{UE1}=P_{base}$. Here, $P_{UE1}$ is priority value of the UE 1 and $P_{base}$ is a base priority value. Now, as soon as data is received from NWDAF and the paging related data gets accumulated, then $P_{nwdaf}$ & $P_{page}$ will also start to affect the UE's priority $P_{UE}$. In an embodiment, the objective function is:

$$P_{UE}=\alpha *P_{base}+\beta *P_{nwdaf}+\gamma *P_{page}$$

where, $P_{UE}$ is a final priority value for a UE, $P_{nwdaf}$ is a priority value based on data received from the NWDAF, $P_{page}$ is a priority value based on data related to paging, and $\alpha, \beta$ & $\gamma$ are random constant values.

Then, at operation 105, the method 100 comprises prioritizing storage of user contexts in a local cache unit in the 5G NF, based on the priority value. For example, once the final prioritized value has been calculated for each UE, then based on the final values, the user context will be stored in a local cache unit like priority queue, map, or some data structure. In an embodiment, a prioritized list corresponds to UEs having a higher probability of receiving 5G call processing events such as UE registration update, PDU session establishment, etc. In an embodiment, the user context may be fetched for the prioritized UE list from the external knowledge database and the fetched context may be stored into the local cache unit. In an embodiment, to store the user context in the local cache unit, an internal cache queue of the cache unit may be classified by designating a cache intra slice within the local cache unit for storing the UE context. In an embodiment, the cache intra slice may be hierarchal soft slicing, network slicing, or similar intra slicing known to a person skilled in the art. The classification can also be extended to more finer details.

For example, classification at AMF may be Emergency Registration at AMF or General Registration at AMF.

In another example, classification at session management function (SMF) may be classification in PDU Session for normal service at SMF and PDU Session for emergency service at SMF.

Thereafter, at operation 107, the method 100 comprises receiving a request for accessing a user context from a UE of the plurality of UEs. For example, the 5G NF may receive a request from the UE for which the UE currently requires to access the user context. In an embodiment, the said request may be a part of list of requests received at the 5G NF from the plurality of UEs.

Then, at operation 109, the method 100 comprises accessing the user context from the cache unit based on the received request. In an embodiment, the 5G NF may access the user context from the cache unit to provide it to the UE. Further, the 5G NF may provide the user context to the UE.

Figure 3:
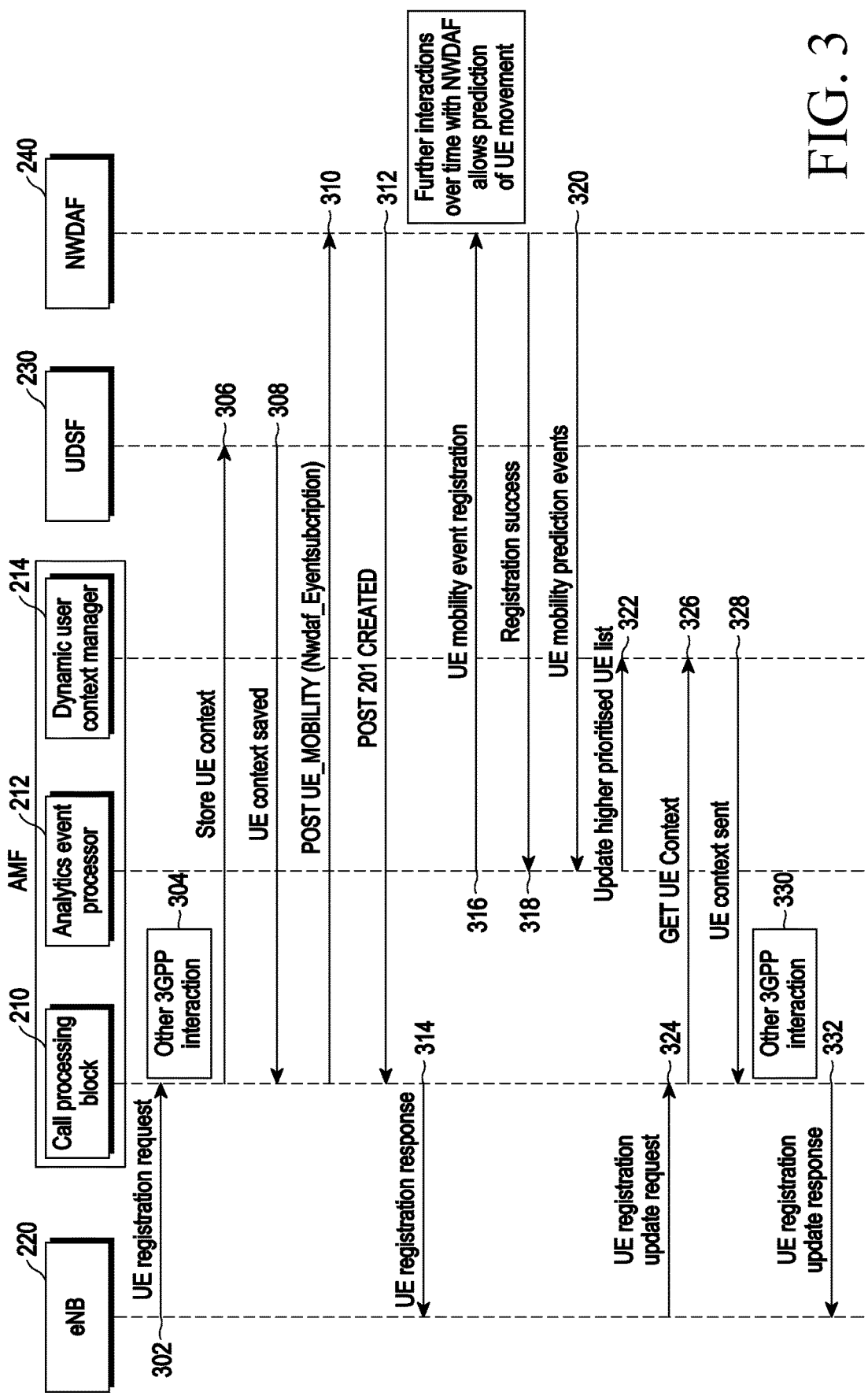
FIG. 3 illustrates a signal flow diagram for improving cache management in a 5G NF, according an embodiment of the disclosure.

FIG. 3 illustrates a signal flow diagram for improving cache management in a 5G NF, according to an embodiment of the disclosure.

Referring to FIG. 3, the call processing block 210 receives a registration request, i.e., UE initial attach request, in operation 302. Other 3GPP interactions may occur in operation 304. Since the UE is attaching for a first time, user context specific data is created and stored in UDSF 230 in operations 306 and 306. The call processing block 210 also informs NWDAF 240 about the UE location and proceeds with completing the attach procedure in operations 310, 312, and 314. Further, events from the AMF with respect to the UE (such as any 5G call processing events related to a particular UE like UE registration update received from eNb 220) are sent to NWDAF 240 over a period of time in operation 316. Then, the analytics event processor 212 registers with the NWDAF 240 for receiving UE mobility related events in operation 318. Once UE mobility analytics events are received (such as when a NWDAF Event Subscription Notification (defined in Table 1) is received with event as UE MOBILITY) in operation 320, the analytic event processor shares a higher prioritized UE list with the dynamic user context manager 214 in operation 322. Further, the dynamic user context manager 214 receives UE mobility events from NWDAF 240 and keeps the local caching queue updated. The call processing block 210 receives a UE registration update request which needs initial UE user context access in operation 324. The call processing block 210 contacts dynamic user context manager 214 for receiving user context locally in operations 326 and 328. Hence, there is no external interaction with UDSF 230 for fetching UE user context. The call processing block 210 may proceed with other $3^{rd}$ generation partnership project (3GPP) interactions in operation 330 and finally send the Registration Update response in operation 332.

In a further embodiment, the AMF receives a UE mobility notification from the NWDAF. In an embodiment, the UE mobility notification may be at least one of Nnwdaf Events Subscription Notification, Event Notification, UE mobility, or location information. The Nnwdaf Events Subscription Notification may represent notification structure that is received from the NWDAF, as shown in below Table 1.

TABLE 1

Definition of type NnwdafEventsSubscriptionNotification

| Attribute name | Data type | P | Cardinality | Description | Applicability |
|---|---|---|---|---|---|
| eventNotifications | Array (Event Notification) | M | 1 . . . N | Notificaitons about Individual Events | |
| subscriptionid | String | M | 1 | String dentifying a subscription to the Nnwdaf_EventsSubscription Service | |

The Event Notification may represent a notification structure that is received from the NWDAF. The event could be NF load information, network slice level load information, or service experience and UE mobility information. The structure has mandatory parameters such as event type, which explains a type of event received from the NWDAF and for UE mobility the structure has mobility event data shown below as UeMobility.

TABLE 2

Definition of tye EventNotification

| Attribute name | Data type | P | Cardinality | Description | Applicability |
|---|---|---|---|---|---|
| Event | NwdafEvent | M | 1 | Event that is notified. | |
| ueMobs | Array (UeMobility) | C | 1 . . . N | The UE mobility information. When subscribed event is "UE_MOBILITY", the ueMobs shall be included. | UeMobility |

The UeMobility may represent a notification structure that is received from the NWDAF. This structure has details about the time of day and details about the time, duration information of the UE, as shown below in Table 3.

TABLE 3

Type UeMobility

| Attribute name | Data type | P | Cardinality | Description | Applicability |
|---|---|---|---|---|---|
| ts | Data Time | O | 0 . . . 1 | This attribute identifies the timestamp when the UE arrives the location. (NOTE 1) | |

TABLE 3-continued

| | Type UeMobility | | | | |
|---|---|---|---|---|---|
| Attribute name | Data type | P | Cardinality | Description | Applicability |
| recurring Time | ScheduledCommunicationTime | O | 0 . . . 1 | Identifies time of the day and day of the week which are valid within the observation period when the UE moves. (NOTE 1, NOTE 2) | |
| duration | DurationSec | M | 1 | This attribute identifies the time duration the UE stays in the location. If the analytics result applies for a group of UEs, it indicates the average duration for the group of UEs. | |
| duration Variance | Float | C | 0 . . . 1 | This attribute indicates the variance of the analysed durations for the group of UEs. It shall be provided if the analytics result applies for a group of UEs. | |
| locinfos | Array (Locationinfo) | M | 1 . . . N | This attribute includes a list of UE location information during the time duration. | |

NOTE 1:
Either ts or recurring Time shall be provided.
NOTE 2:
If this attribute is present, it indicates the UE movement is periodic. This attribute is suitable to be present for a recurring mobility in a long observation time.

The LocationInfo may represent actual user location in terms of TAI as part of a UserLocation structure, as shown below in Table 4. Confidence lets the user know about the amount of data correctness.

TABLE 4

| | Definition of tye LocationInfo | | | | |
|---|---|---|---|---|---|
| Attribute name | Data type | P | Cardinality | Description | Applicability |
| loc | UserLocation | M | 1 | This attribute contains the detailed location, the ueLocationTimestamp attribute in the 3GPP access type of UserLocation data type shall not be provided. | |
| ratio | SamplingRatio | C | 0 . . . 1 | This attribute contains the percentage of UEs with same analytics result in the group. Shall be present if the analytics result applies for a group of UEs. | |

TABLE 4-continued

Definition of tye LocationInfo

| Attribute name | Data type | P | Cardinality | Description | Applicability |
|---|---|---|---|---|---|
| confidence | Uinteger | C | 0 . . . 1 | Indicates the confidence of the prediction. Shall be present if the analytics result is a prediction. | |

The received notification may be processed and the processed notification data may be forwarded to the dynamic context manager. The dynamic context manager may determine an updated priority value for each of the plurality of UEs in the received list based on the received notification and may update a context queue within the cache unit based on the updated priority value. In an embodiment, the dynamic user context manager may receive analytics data based UE prioritization from the analytics event processor and paging data based UE prioritization from the call processing block. The dynamic user context manager processes the entire data using a generic objective function and generates final UE prioritization, which then may be used as an eviction procedure, for e.g., P_final=P_nwdaf+P_paging+P_LRU.

The dynamic user context manager may then modify the cache eviction procedure based on the updated priority value. It should be noted that the dynamic user context manager may also use a related-art cache eviction procedure-based prioritization.

In an embodiment, the disclosure optimizes the cache eviction procedure.

Figure 5:
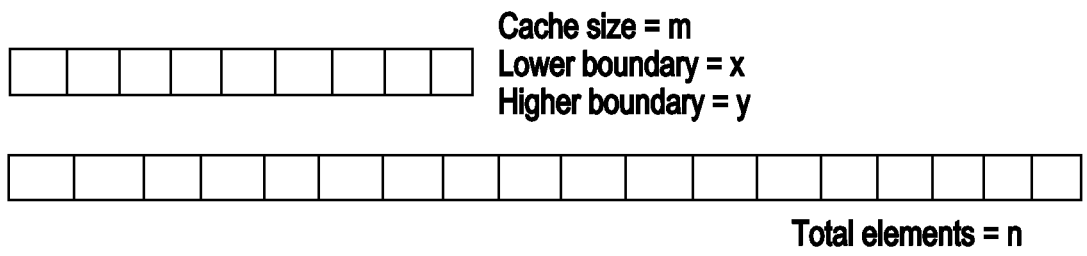
FIG. 5 illustrates a cache unit, according to an embodiment of the disclosure.

FIG. 5 illustrates a cache unit, according to an embodiment of the disclosure.

Referring to FIG. 5, m<n, then total data in cache is m which is always less than total available elements (n). In cache management policies, an audit is introduced to check the cache size. There is a lower limit (x) and upper limit (y) set for the cache. When during audit it is observed that cache limit is reaching (y), the cache eviction procedure of the related art, e.g., LRU thrashing, comes into place which deletes older cache entries. However, such old entries may be of higher priority compared to new entries and thus, shall be retained in the cache unit. The disclosure provides a solution where higher priority UEs are calculated by utilizing NWDAF information and other supporting call processing block information. Those selected UEs are protected from thrashing according to their individual priority. Proposed thrashing protection technique helps in protecting the cache at caching agent and reduces UDSF access. In an embodiment, the method 100 comprises receiving a time-expiry based audit trigger. The audit trigger may be configurable and may be configured by the network provider. Then, the method 100 comprises determining, in response to the trigger, if size of cache is above a predetermined threshold level.

For example, the predefined threshold level can be a fixed number like 1000 cache entries or it can be a percentage value like 95% of the total storage capacity. Then, the method 100 comprises purging user context from the cache unit based on the priority level until the size of the cache unit is below the predetermined threshold level, wherein the user context are purged in order of decreasing priority value.

Figure 4:
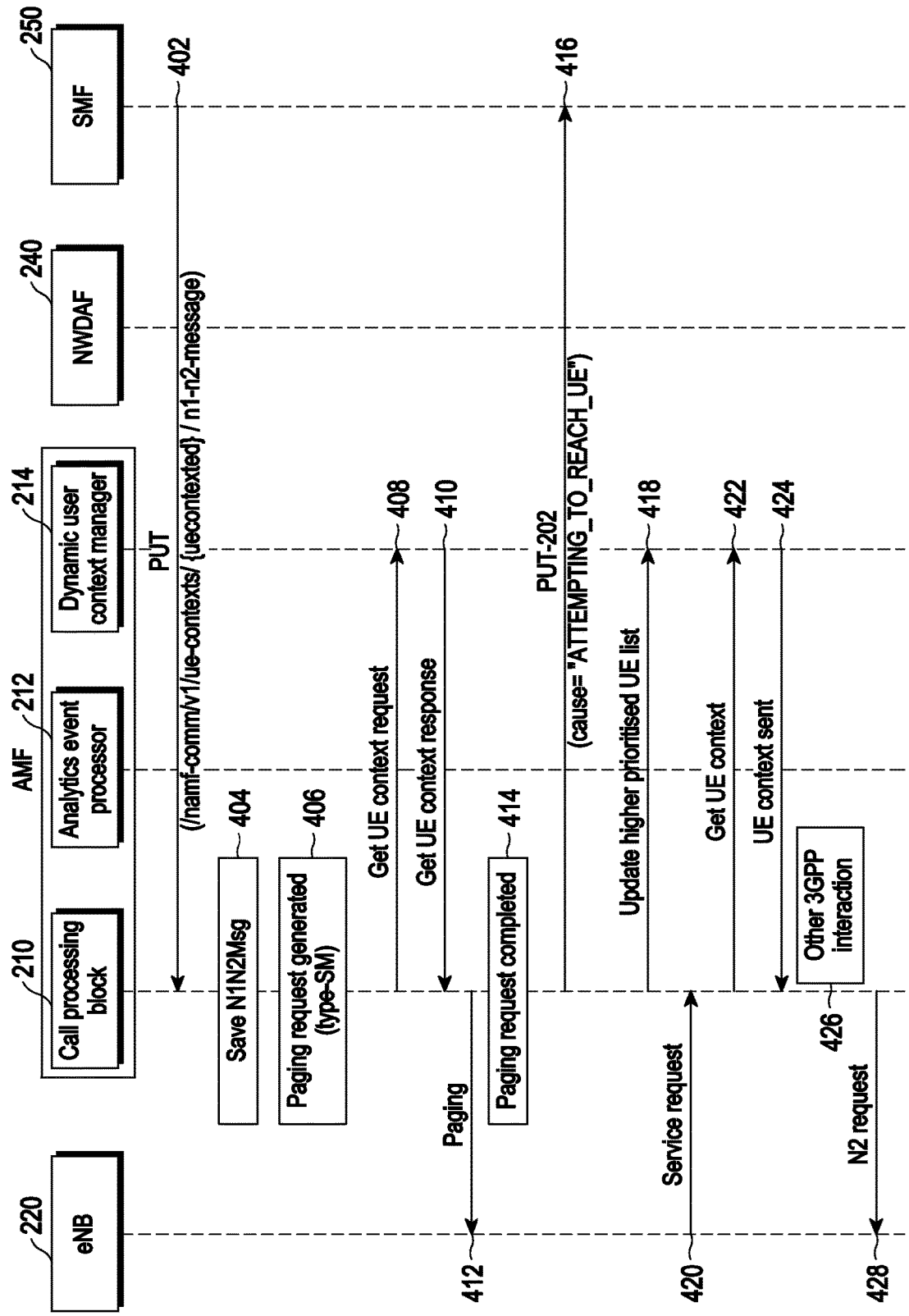
FIG. 4 illustrates a signal flow diagram for signal paging/ service request scenario, according to an embodiment of the disclosure.

FIG. 4 illustrates a signal flow diagram for signal paging/service request scenario, according to an embodiment of the disclosure.

Referring to FIG. 4, the call processing block 210 receives an N1N2 request from SMF 250 in operation 402. The call processing block 210 saves the N1N2 message in operation 404. The call processing block 210 also generates paging request with type=SM in operation 406. Furthermore, the call processing block 210 sends a GET UE context request to dynamic user context manager 214 in operation 408. The dynamic user context manager 214 processes the GET UE context request and sends a UE context in response in operation 410. The call processing block 210 sends paging to eNb 220 in operation 412. After the completion of paging request in operation 414, the call processing block 210 responds to N1N2 message received from SMF 250 in operation 416. The call processing block 210 shares higher prioritized UE list with the dynamic user context manager 214 in operation 418. The call processing block 210 receives service request which needs user context access in operation 420. The call processing block 210 contacts the dynamic user context manager 214 for receiving user context locally in operations 422 and 424. There is no external interaction for fetching UE user context. The call processing block 210 proceeds with other 3GPP interactions in operation 426 and sends a radio resource control (RRC) reconfiguration message in operation 428.

The system 200 of FIG. 2 may comprise a memory 204 and a processor 202 coupled to the memory 204. In an embodiment, the processor 202 may be configured to receive a list of requests from a plurality of UEs requiring access to their corresponding user context, determine a priority value for each of the plurality of UEs in the received list based on at least one of analytics data received from a NWDAF, paging data, or cache eviction policy, prioritize storage of user contexts in a local cache unit based on the priority value for each of the plurality of UEs, receive a request for accessing a user context from a UE of the plurality of UEs, and access the user context from the local cache unit based on the received request. In an embodiment, the system 200 may be configured to perform the method as discussed in respect to FIGS. 1, 3, and 4. Further, the system 200 may be a part of the user device. In another embodiment, the system 200 may be connected to the user device.

Hence, the disclosed techniques provide various advantages such as:

Improving latency and overall throughput in handling of user context dependent requests in 5G core NF.

The proposed techniques may be enhanced to multiple NFs in a 5G core for providing improvised cache management.

The proposed techniques do not require any change in 3GPP call flow for a 5G network.

While specific language has been used to describe the disclosure, any limitations arising on account of the same are not intended. As would be apparent to a person in the art, various working modifications may be made to the method in order to implement the inventive concept as taught herein.

The drawings and the forgoing description give examples of embodiments. Those skilled in the art will appreciate that one or more of the described elements may well be combined into a single functional element. Alternatively, certain elements may be split into multiple functional elements. Elements from one embodiment may be added to another embodiment. For example, orders of processes described herein may be changed and are not limited to the manner described herein.

Moreover, the actions of any flow diagram need not be implemented in the order shown; nor do all of the acts necessarily need to be performed. Also, those acts that are not dependent on other acts may be performed in parallel with the other acts. The scope of embodiments is by no means limited by these specific examples. Numerous variations, whether explicitly given in the specification or not, such as differences in structure, dimension, and use of material, are possible. The scope of embodiments is at least as broad as given by the following claims.

Benefits, other advantages, and solutions to problems have been described above with regard to specific embodiments. However, the benefits, advantages, solutions to problems, and any component(s) that may cause any benefit, advantage, or solution to occur or become more pronounced are not to be construed as a critical, required, or essential feature or component of any or all the claims.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A method for improving cache management in a 5th generation (5G) network function (NF), the method comprising:
   receiving a list of requests from a plurality of user equipments (UEs) requiring access to their corresponding user contexts;
   determining a priority value for each of the plurality of UEs in the list based on at least one of analytics data received from a network and data analysis function (NWDAF), paging data, or cache eviction policy;
   prioritizing storage of user contexts in a cache unit of the 5G NF based on the priority value for each of the plurality of UEs, the prioritizing of the storage of the user contexts in the cache unit including fetching the user contexts for a prioritized UE list from an external database;
   receiving a request for accessing a user context from a UE of the plurality of UEs; and
   accessing the user context from the cache unit based on the request.

2. The method of claim 1, wherein prior to the receiving of the list, the method comprises:
   in response to a registration request of at least one UE among the plurality of UEs, registering the at least one UE at the 5G NF; and
   storing at least one user context related to the at least one UE in the external database.

3. The method of claim 2, wherein the external database corresponds to a third party unstructured data storage function (UDSF).

4. The method of claim 2, further comprising:
   storing the at least one user context in the cache unit.

5. The method of claim 4, wherein the prioritized UE list corresponds to UEs having a higher probability of receiving 5G call processing events.

6. The method of claim 4, wherein the storing of the at least one user context in the cache unit comprises:
   classifying an internal cache queue of the cache unit by designating a cache intra slice within the cache unit for storing the at least one user context.

7. The method of claim 1, further comprising:
   receiving a notification for UE mobility from the NWDAF;
   processing the notification;
   determining an updated priority value for each of the plurality of UEs in the list based on the processed notification;
   updating a user context queue within the cache unit based on the updated priority value; and
   modifying a cache eviction procedure based on the updated priority value.

8. The method of claim 1, further comprising:
   receiving a time-expiry based audit trigger;
   in response to the time-expiry based audit trigger, determining whether a size of cache of the cache unit is above a threshold level; and
   purging at least one user context from the cache unit based on the priority value until the size of cache of the cache unit is below the threshold level, wherein the at least one user context is purged in an order of decreasing the priority value.

9. The method of claim 1, wherein the cache eviction policy corresponds to at least one of a least recently used (LRU) or a least frequently used (LFU).

10. A system for improving cache management in a $5^{th}$ generation (5G) network function (NF), the system comprising:
    memory; and
    a processor operatively coupled to the memory and configured to:
    receive a list of requests from a plurality of user equipments (UEs) requiring access to their corresponding user contexts,
    determine a priority value for each of the plurality of UEs in the list based on at least one of analytics data received from a network and data analysis function (NWDAF), paging data, or cache eviction policy,
    prioritize storage of user contexts in a cache unit of the 5G NF based on the priority value for each of the plurality of UEs, the prioritizing of the storage of the user contexts in the cache unit including fetching the user contexts for a prioritized UE list from an external database,
    receive a request for accessing a user context from a UE of the plurality of UEs, and
    access the user context from the cache unit based on the request.

11. The system of claim 10, wherein processor is further configured to, prior to the list being received:
    in response to a registration request of at least one UE among the plurality of UEs, register the at least one UE at the 5G NF, and
    store at least one user context related to the at least one UE in the external database.

12. The system of claim 11, wherein the external database corresponds to a third party unstructured data storage function (UDSF).

13. The system of claim 11, wherein the processor is further configured to:
   store the at least one user context in the cache unit.

14. The system of claim 13, wherein the prioritized UE list corresponds to UEs having a higher probability of receiving 5G call processing events.

15. The system of claim 14, wherein, to store the at least one user context in the cache unit, the processor is further configured to:
   classify an internal cache queue of the cache unit by designating a cache intra slice within the cache unit for storing the at least one user context.

16. The system of claim 10, wherein the processor is further configured to:
   receive a notification for UE mobility from the NWDAF,
   process the notification,
   determine an updated priority value for each of the plurality of UEs in the list based on the processed notification,
   update a user context queue within the cache unit based on the updated priority value, and
   modify a cache eviction procedure based on the updated priority value.

17. The system of claim 10,
   wherein the processor is further configured to:
      receive a time-expiry based audit trigger,
      in response to the time-expiry based audit trigger, determine whether a size of cache of the cache unit is above a threshold level, and
      purge at least one user context from the cache unit based on the priority value until the size of cache of the cache unit is below the threshold level, and
   wherein the at least one user context is purged in an order of decreasing the priority value.

18. The system of claim 10, wherein the cache eviction policy corresponds to at least one of a least recently used (LRU) or a least frequently used (LFU).

* * * * *